United States Patent [19]

Petrovic et al.

[11] Patent Number: 5,063,182

[45] Date of Patent: Nov. 5, 1991

[54] ZIRCONIA-MOLYBDENUM DISILICIDE COMPOSITES

[75] Inventors: John J. Petrovic; Richard E. Honnell, both of Los Alamos, N. Mex.

[73] Assignee: The United States of America as represented by the United States Department of Energy, Washington, D.C.

[21] Appl. No.: 575,913

[22] Filed: Aug. 31, 1990

[51] Int. Cl.⁵ .................... C04B 35/48; C04B 35/58
[52] U.S. Cl. ..................................... 501/96; 501/103
[58] Field of Search .................................. 501/96, 103

[56] References Cited

U.S. PATENT DOCUMENTS

| | | | |
|---|---|---|---|
| 4,407,971 | 10/1983 | Komatsu et al. | 501/98 |
| 4,528,121 | 7/1985 | Matsushita et al. | 501/96 |
| 4,626,516 | 12/1986 | Morelock | 501/96 |
| 4,927,792 | 5/1990 | Petrovic et al. | 501/92 |
| 5,000,896 | 3/1991 | Petrovic et al. | 501/92 |

*Primary Examiner*—Mark L. Bell
*Attorney, Agent, or Firm*—Richard J. Cordovano; Paul D. Gaetjens; William R. Moser

[57] ABSTRACT

Compositions of matter comprised of molybdenum disilicide and zirconium oxide in one of three forms: pure, partially stabilized, or fully stabilized and methods of making the compositions. The stabilized zirconia is crystallographically stabilized by mixing it with yttrium oxide, calcium oxide, cerium oxide, or magnesium oxide and it may be partially stabilized or fully stabilized depending on the amount of stabilizing agent in the mixture.

3 Claims, No Drawings

ZIRCONIA-MOLYBDENUM DISILICIDE COMPOSITES

This invention is the result of a contract with the Department of Energy (Contract No. W-7405-ENG-36).

BACKGROUND OF THE INVENTION

This invention relates to the art of materials science and, more particularly, to nonmetallic materials and powder metallurgy.

Ceramic materials have certain outstanding properties, such as high temperature strength, corrosion resistance, low density, and low thermal expansion, which make them attractive materials for high temperature applications However, ceramics differ from metals in one very important aspect: they are brittle, that is, upon loading, they do not deform before fracturing This lack of a stress-relieving characteristic, which also causes ceramics to have low tolerance for flaws, is a major drawback to using them in high temperature structural applications There is a class of materials which offers the advantages of a ceramic and certain of the beneficial mechanical characteristics of a metal. These materials are intermetallics, which at high temperature have the excellent properties of a ceramic, but also behave mechanically like a metal in that they show yielding and stress-relieving characteristics.

Molybdenum disilicide ($MoSi_2$) is an intermetallic compound which has potential for structural use in oxidizing environments at high temperatures. It has a melting point of 2030° C. and its oxidation resistance at high temperature is very good. Mechanically, $MoSi_2$ behaves as a metal at high temperatures since it undergoes a brittle-to-ductile transition at about 900°-1000° C. Thus, $MoSi_2$ has a stress relieving characteristic at high temperatures. The major problems impeding the use of $MoSi_2$ as a high temperature structural material with potential use temperatures in the range of 1200°-1800° C. are its relatively low strength at high temperatures and its brittleness and lack of fracture toughness at low temperatures. Fracture toughness may be defined as resistance to fracture. At low temperatures, strength is limited by brittle fracture, while at high temperatures, it is limited by plastic deformation or creep. For this material to be a viable structural material at high temperatures, both its elevated temperature strength and its room temperature fracture toughness must be improved.

Zirconium oxide (zirconia, $ZrO_2$) is a ceramic which possesses high strength and high fracture toughness at room temperatures, but not at high temperatures. This suggests that composites of $MoSi_2$ and $ZrO_2$ will have high fracture toughness at room temperatures due to the $ZrO_2$ and at high temperatures due to the $MoSi_2$.

Pure zirconia exists in a tetragonal crystalline state at high temperatures and in a monoclinic state at low temperatures. As tetragonal zirconia is cooled through its transformation temperature to the monoclinic form, there is a volume change which is sufficient to exceed elastic and fracture limits and can only be accommodated by cracking. Thus, fabrication of large components of pure zirconia is not possible because they develop cracks upon cooling. However, this volume expansion of the tetragonal to monoclinic transformation can be used to improve fracture toughness and strength.

The properties of zirconia may be modified by the addition of crystallographic stabilizing agents. These stabilizing agents include yttrium oxide ($Y_2O_3$), magnesium oxide (MgO), calcium oxide (CaO), and cerium oxide ($CeO_2$) A mixture of zirconia and stabilizing agent may be characterized as partially stabilized or fully stabilized. Partially stabilized zirconia (PSZ) remains in the tetragonal state upon cooling but will partially transform to the monoclinic state under certain circumstances. Fully stabilized zirconia (FSZ) is in the cubic crystalline state at high temperatures and remains so as it is cooled. The amounts of stabilizing agent to obtain partial stabilization and full stabilization varies with the stabilization agent used and can be determined from a phase diagram for zirconia and the stabilizing agent.

Information on zirconia is available in a publication by Magnesium Elektron LTD. of Twickenham, England entitled "An Introduction To Zirconia; Zirconia And Zirconia Ceramics," which was written by R. Stevens of the University of Leeds.

Examples of immediate applications for the inventive materials are engine turbocharger rotors and adiabatic diesel engines, which do not need a cooling system. Because the room temperature electrical conductivity of $MoSi_2$ is relatively high, it may be possible to use electrodischarge machining of the inventive composites. This method of machining is significantly less expensive than the diamond machining process which is presently used for zirconia objects. Also, though zirconia will not couple to 2.45 GHz microwave radiation at room temperature, it is expected that the inventive composites will do so, so that microwave processing can be used in their manufacture.

SUMMARY OF THE INVENTION

This invention is compositions of matter comprised of molybdenum disilicide and zirconium oxide in one of three forms: pure, partially stabilized, or fully stabilized. Further, this invention is methods of making the compositions. The stabilized zirconia is crystallographically stabilized by mixing it with $Y_2O_3$, $CeO_2$, CaO, or MgO and it may be partially stabilized or fully stabilized depending on the amount of stabilizing agent in the mixture.

DESCRIPTION OF THE INVENTION

The present invention is composites which are (1) $MoSi_2$ reinforced with zirconia which may be pure (unstabilized), partially stabilized, or fully stabilized, (2) pure zirconia, PSZ, or FSZ reinforced with MoSi2, and (3) an interlocking network of $MoSi_2$ and $ZrO_2$ which may be called a cermet.

It is believed that pure $ZrO_2$ particles improve the toughness and strength of a $MoSi_2$ matrix by a mechanism known as transformation toughening. Upon cooling through the tetragonal to monoclinic transformation temperature, the volume expansion causes microcracks to form in the matrix. These microcracks will absorb or dissipate the energy of a crack propagating in the matrix, thereby increasing the toughness of the ceramic.

Reinforcement of $MoSi_2$ with particles of partially stabilized zirconia (PSZ) provides improved low temperature fracture toughness due to the mechanism of transformation toughening and also has the potential to increase elevated temperature strength and creep resistance of these $MoSi_2$ matrix composites. The transformation toughening mechanism in PSZ is different from that of pure $ZrO_2$. In PSZ, the tetragonal to monoclinic crystallographic martensitic transformation occurs preferentially in the stress field at crack tips and not in the bulk of the material. The volume change associated with the transformation lowers crack tip stresses, thus increasing the fracture toughness of the composite material. The high temperature effects would occur due to a dispersion strengthening effect on dislocation motion at elevated temperatures in a similar fashion to the high temperature strengthening effects which have been observed for SiC whisker and SiC particle reinforcements of $MoSi_2$.

The improvement in properties of a $MoSi_2$ matrix by adding FSZ to it is not due to transformation toughening, but is probably crack deflection toughening.

Zirconia is very stable and its low thermal conductivity makes it desirable as a structural insulator. Monolithic zirconia materials, while possessing high fracture toughness at low temperatures due to a transformation toughening effect, lose their toughened characteristics as the temperature is increased because the martensitic transformation responsible for the toughening reduces in extent with increasing temperature. Typically, all transformation toughening is lost at temperatures above approximately 900° C. However, $MoSi_2$ begins to exhibit plastic deformation above 900°-1000° C. Thus the presence of $MoSi_2$ particles in zirconia matrices could lead to significant improvements in the elevated temperature mechanical properties of these matrices such as fracture toughness, strength, and crack growth behavior. Above 1000° C., $MoSi_2$ particles act as ductile metal particles in restraining the initiation and propagation of brittle cracks in the zirconia matrix by means of plastic deformation energy absorption. $MoSi_2$ toughening effects increase with increasing temperature and therefore will compensate for the decrease in transformation toughening.

There are three important points to note regarding the mixtures or alloys of the present invention. First, $MoSi_2$ and $ZrO_2$ are thermodynamically stable and thus will not react during fabrication of composites or when the composites are in use at elevated temperatures. This means that the crystallographic martensitic transformation which produces toughening of the pure $ZrO_2$ and PSZ will not be affected by changes in composition due to chemical reactions Second, the elevated temperature oxidation resistance of the zirconia particle-$MoSi_2$ matrix composite will still be good in comparison to pure $MoSi_2$, since there is little reaction between $ZrO_2$ and the protective $SiO_2$ oxidation layer that forms on $MoSi_2$ ($SiO_2$ is thermodynamically stable with $ZrSiO_4$ to a temperature of approximately 1700° C.). Third, the thermal expansion coefficients of $MoSi_2$ are similar ($MoSi_2 = 7.2$ $C^{-1}$ and stabilized $ZrO_2 = 7.5$ $C^{-1}$ at room temperature). This means that any thermal expansion mismatch stresses in the composite system will be minimal.

Inventive compositions were made in the following manner. $MoSi_2$ powder of 99.9% purity obtained from Alfa Products of Danvers, Mass. was screened to obtain powder which passed through a 400 mesh screen (opening of approximately 37 microns). The resulting −400 mesh powder and zirconia powder were blended in a high speed mechanical blender in the amounts required to provide the desired composition. An aqueous slip suspension containing the blended powders and having a solids loading of about 50 weight percent was prepared. The amount of solids is not critical, but is preferably from about 40% to about 65 wt %. Deionized water having a pH adjusted to 9.5 with ammonium hydroxide was used to make the slip. The pH value and the adjusting agent used are not critical. The suspension was mechanically stirred and ultrasonified to keep the constituents from settling before casting was accomplished. The slip was cast into a plaster of paris mold and allowed to set. The green slip cast body was dried and then comminuted to −10 mesh (less than 2 mm) shards to yield a material suitable for hot pressing. Of course each shard, or large particle, was substantially homogenous as a result of mixing the starting materials and the suspension.

The comminuted material was placed in a Grafoil ® lined die and hot-pressed into disks measuring approximately 31.8 mm in diameter by 6.35 mm thick. Hot pressing was performed in argon and temperatures were measured optically. The pressure applied was about 30 MPa and the specimen was heated to about 1700° C., at which point heating was stopped and a hold period started. Hold time at the peak temperature of about 1700° C. was about 5 minutes and then slow cooling was started, though it may be desirable to use a longer hold time of up to about eight hours. When the decreasing temperature reached 1200° C., the load was slowly removed and the specimen allowed to cool to room temperature. The coherent shape was then removed from the die. It is expected that the peak temperatures used in this process will fall within a range of about 1100° to about 2000° C. The pressure applied may be as high as 210 MPa or as low as 1.0 MPa or 0 MPa if pressureless sintering is used.

Slip casting to form a green body and then treating it by means of a size reduction process is done to provide a more homogenous material or a material which is better adapted for hot pressing than a dry mixture of the components. However, those skilled in the art are familiar with other methods of preparing material for hot pressing which are applicable to the compositions of this invention. Pressureless sintering (applying heat only) of a dry blend of materials may also be used to make the inventive compositions. Also, the powder may be hot pressed after blending, omitting the slip casting step. The primary determinant of material particle size in hot pressing is homogeneity of the finished article or specimen: material suitable for hot pressing may be of any particular size which will fit into the hot pressing die.

In preliminary work to establish feasibility, specimens of 30 vol % PSZ in an $MoSi_2$ matrix were made and characterized. The stabilizing agent in the zirconia was CaO in an amount of 2.3 wt %. A SEM micrograph of the PSZ powder showed that a relatively large distribution of particle sizes was present, with particles ranging from approximately 5 microns down to submicron size. X-ray analysis of the PSZ powder showed a major monoclinic phase and minor cubic phase with no prominent evidence of retained metastable tetragonal phase. Hot pressed specimens had densities which were about 96% of theoretical. Metallographic examination of the composites showed a dense microstructure and a reasonably good distribution of PSZ particles in the $MoSi_2$ matrix, although some microstructural inhomogeneities were evident. Microstructural observation of the specimens suggested that no reaction took place between the PSZ particles and the $MoSi_2$ matrix as a result of the hot pressing. Also, x-ray diffraction analysis showed that there was no reaction. This indicates that mixtures of $ZrO_2$ and $MoSi_2$ are thermodynamically stable, at least up to the hot pressing temperature. It also shows that the presence of the zirconia stabilizing CaO did not induce any reactions. The x-ray diffraction pattern of the PSZ after hot pressing was similar to the powder PSZ pattern. The absence of chemical reactions means that the tetragonal to monoclinic martensitic transformation which produces the transformation toughening effect is not negatively influenced by changes in composition due to chemical reactions. This indicates that it should be possible to optimize the transformation toughening mechanism to significantly toughen the composite material at low temperatures.

In a preliminary assessment of the oxidation behavior of the 30 vol % PSZ particle-$MoSi_2$ matrix composite, a specimen was heated in air in a furnace and held at 1500° C. for two hours before cooling. The oxide layer formed was macroscopically glassy-appearing and both coherent and adherent to the composite surface. Its thickness was approximately 50 microns. The layer contained a whitish particulate phase. Phase species present in the composite oxide layer are expected to be $ZrO_2$, $ZrSiO_4$, and $SiO_2$, since pure $MoSi_2$ forms a glassy $SiO_2$ oxide layer at this temperature. The phase diagram for $ZrO_2$-$SiO_2$ indicates that the solid phases $ZrO_2$-$ZrSiO_4$ and $ZrSiO_4$-$SiO_2$ are thermodynamically stable until a temperature of approximately 1700° C., where a $ZrO_2$-liquid two-phase field forms.

Microhardness indentation fracture toughness measurements were made on polished sections of the 30 vol % PSZ particle-$MoSi_2$ matrix composite specimens and on pure $MoSi_2$ for comparison purposes. A 10 kilogram Vickers indentation was employed. Fracture toughness was calculated using the formulations of Anstis et al. (G. R. Anstis, P. Chantikul, B. R. Lawn, and D. B. Marshall, J. Amer. Ceram. Soc., 64 (1981), 533).

The fracture toughness in $MPa\text{-}m^{0.5}$ of the pure $MoSi_2$ sample was 2.58; that of the 30 vol % PSZ-$MoSi_2$ matrix was 6.56, which is about 2.5 times greater. The hardness in GPa of the $MoSi_2$ was 10.0 and that of the composite was 8.49. Microscopic examination of the test specimens showed that, at the same indentation load, the radial crack pattern in the $MoSi_2$ specimen is significantly larger than in the composite specimen. Inspection of one of the radial cracks of the composite showed crack segments running along PSZ-$MoSi_2$ phase boundaries and through the PSZ phase. Crack bridging of the PSZ phase was evident.

A group of specimens having compositions ranging from 10 to 90 vol % PSZ in a $MoSi_2$ matrix, a pure $ZrO_2$ specimen, and a pure $MoSi_2$ specimen were made as described above except that the peak pressing temperature was 1600° C. The stabilizing agent mixed with the zirconia was $Y_2O_3$ in an amount of 2.5 mol % (4.5 wt %). The PSZ had an average particle size of 0.3 microns and was obtained from the Tosoh Corporation of Atlanta and Tokyo. Room temperature fracture toughness of these specimens was determined. The results of these tests are shown in Table I. The data show increases in fracture toughness with increasing amounts of $ZrO_2$.

TABLE I

| Volume Percent $ZrO_2$ in $MoSi_2$ | Fracture Toughness $MPa\text{-}m^{0.5}$ |
|---|---|
| 0 | 2.6 |
| 10 | 2.9 |
| 20 | 3.9 |
| 30 | 4.5 |
| 40 | 5.3 |
| 50 | 4.7 |
| 60 | 6.5 |
| 70 | 6.7 |
| 80 | 8.3 |
| 90 | 7.9 |
| 100 | 8.0 |

A group of specimens having a composition of 80 vol % $MoSi_2$ and one pure $MoSi_2$ specimen was prepared as described above. The remaining 20 vol % of each composite was zirconia with one specimen having unstabilized zirconia and the balance having stabilized zirconia of various compositions. The stabilizing agents were $Y_2O_3$, MgO, and $CeO_2$ in the amounts shown in Table II. Fracture toughness and hardness at room temperature of the specimens are presented in Table II. The 8 mol % $Y_2O_3$ specimen was fully stabilized. All other specimens having a stabilizing agent were partially stabilized.

The unstabilized $ZrO_2$ composite exhibited significant toughening as compared to pure $MoSi_2$, showing a fracture toughness value three times that of $MoSi_2$. It is believed that this is due to spontaneous transformation toughening due to microcracking. With the addition of $Y_2O_3$ to the $ZrO_2$, the composite toughness level dropped significantly; toughness values for partially stabilized $ZrO_2$ particles (2.0, 2.5, 3.0, 4.0 mol %) and fully stabilized $ZrO_2$ (8.0 mol %) were lower. Toughness values for MgO partially stabilized $ZrO_2$ and $CeO_2$ partially stabilized $ZrO_2$ wee somewhat higher than the corresponding $Y_2O_3$ partially stabilized materials. It is believed that the mechanism of toughening of the partially stabilized specimens is crack tip transformation toughening and that of the fully stabilized specimen is crack deflection toughening.

TABLE II

| Specimen | | Fracture Toughness | Hardness |
|---|---|---|---|
| Agent | mol % (wt %) | $MPa\text{-}m^{\frac{1}{2}}$ | GPa |
| pure $MoSi_2$ | — | 2.6 | 10.00 |
| unstab. $ZrO_2$ | — | 7.8 | 8.03 |
| $Y_2O_3$ | 2.0 (3.5) | 4.3 | 10.90 |
| $Y_2O_3$ | 2.5 (4.5) | 4.3 | 10.90 |
| $Y_2O_3$ | 3.0 (5.2) | 4.0 | 10.50 |
| $Y_2O_3$ | 4.0 (7.0) | 3.4 | 10.60 |
| $Y_2O_3$ | 8.0 (13.4) | 3.6 | 10.60 |
| MgO | 9.0 (3.0) | 5.4 | 7.50 |
| $CeO_2$ | 12.0 (15.5) | 5.2 | 7.36 |

What is claimed is:

1. A composition of matter consisting essentially of molybdenum disilicide and a material chosen from a group consisting of pure zirconium oxide, partially stabilized zirconium oxide, and fully stabilized zirconium oxide.

2. The composition of claim I where said zirconium oxide is partially stabilized by adding to it calcium oxide, cerium oxide, yttrium oxide or magnesium oxide.

3. The composition of claim 1 where said zirconium oxide is fully stabilized by adding to it calcium oxide, cerium oxide, yttrium oxide or magnesium oxide.

* * * * *